(12) United States Patent
Lundberg et al.

(10) Patent No.: US 11,763,618 B2
(45) Date of Patent: *Sep. 19, 2023

(54) CONTROLLING ACCESS TO AN ACCESS OBJECT

(71) Applicant: ASSA ABLOY AB, Stockholm (SE)

(72) Inventors: Frans Lundberg, Saltsjöbaden (SE); Peter Stenlund, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,321

(22) Filed: Apr. 19, 2021

(65) Prior Publication Data

US 2021/0241559 A1 Aug. 5, 2021

Related U.S. Application Data

(63) Continuation of application No. 16/329,673, filed as application No. PCT/EP2017/071787 on Aug. 30, 2017, now Pat. No. 11,011,002.

(30) Foreign Application Priority Data

Sep. 2, 2016 (EP) .................................... 16187007

(51) Int. Cl.
*G07C 9/21* (2020.01)
*G07C 9/00* (2020.01)
(Continued)

(52) U.S. Cl.
CPC ........... *G07C 9/21* (2020.01); *G07C 9/00174* (2013.01); *G07C 9/20* (2020.01); *H04L 9/088* (2013.01);
(Continued)

(58) Field of Classification Search
CPC .... G06Q 20/20; G06Q 20/206; G06Q 20/341; G06Q 20/385; G06K 19/00
(Continued)

(56) References Cited

U.S. PATENT DOCUMENTS 6,233,685 B1 5/2001 Smith
11,011,002 B2 5/2021 Lundberg et al.
(Continued)

FOREIGN PATENT DOCUMENTS

| CA | 3059330 A1 | * | 12/2018 | ............. | G06F 21/31 |
| CN | 104081297 B | * | 12/2017 | ............. | G05B 15/02 |
| JP | 2011141822 A | * | 7/2011 | | |

OTHER PUBLICATIONS

Taly et al. "Distributed Authorization in Vanadium," arxiv.org, Cornell University Library, 201 Olin Library Cornell University Ithaca, NY, Jul. 2016, 24 pages.
(Continued)

*Primary Examiner* — Edwyn Labaze
(74) *Attorney, Agent, or Firm* — Schwegman Lundberg & Woessner, P.A.

(57) ABSTRACT

It is presented a method for controlling access to an access object. The method is performed in an access control device and comprises the steps of: receiving a user input to reset the access control device; generating a new identifier for the access control device, and discarding any previously used identifier for the access control device; communicating with an electronic key to obtain an identity of the electronic key; obtaining a plurality of delegations, wherein each delegation is a delegation from a delegator to a receiver; and granting access to the access object only when the plurality of delegations comprise a sequence of delegations covering a delegation path from the access control device, identified using the new identifier, to the electronic key such that, in the sequence of delegations, the delegator of the first del-
(Continued)

egation is the access control device, and the receiver of the last delegation is the electronic key.

14 Claims, 6 Drawing Sheets

(51) Int. Cl.
*H04L 9/08* (2006.01)
*G07C 9/20* (2020.01)
*H04L 9/00* (2022.01)

(52) U.S. Cl.
CPC .............. *G07C 2009/00769* (2013.01); *G07C 2009/00865* (2013.01); *G07C 2009/00873* (2013.01); *G07C 2209/04* (2013.01); *H04L 9/50* (2022.05)

(58) Field of Classification Search
USPC .............................. 235/382.5, 382, 375, 487
See application file for complete search history.

(56) References Cited

U.S. PATENT DOCUMENTS

| | | | | |
|---|---|---|---|---|
| 2003/0212871 | A1* | 11/2003 | Suzuki | G06F 21/31 |
| | | | | 711/164 |
| 2004/0123113 | A1 | 6/2004 | Mathiassen et al. | |
| 2005/0022026 | A1* | 1/2005 | Riordan | G06F 21/55 |
| | | | | 726/4 |
| 2006/0072755 | A1 | 4/2006 | Oskari | |
| 2007/0289002 | A1* | 12/2007 | van der Horst | G06F 21/42 |
| | | | | 726/9 |
| 2008/0059787 | A1* | 3/2008 | Hohenberger | H04L 9/3073 |
| | | | | 713/153 |
| 2008/0320560 | A1 | 12/2008 | Casey et al. | |
| 2010/0077474 | A1 | 3/2010 | Yacoub et al. | |
| 2012/0204032 | A1* | 8/2012 | Wilkins | H04L 63/0428 |
| | | | | 713/170 |
| 2013/0198521 | A1* | 8/2013 | Wu | H04L 9/30 |
| | | | | 713/175 |
| 2014/0089508 | A1 | 3/2014 | Hawver et al. | |
| 2014/0365781 | A1 | 12/2014 | Dmitrienko et al. | |
| 2015/0088741 | A1 | 3/2015 | Lyman et al. | |
| 2016/0224782 | A1 | 8/2016 | Miyakawa | |
| 2017/0083710 | A1 | 3/2017 | Chapman, III | |
| 2018/0013694 | A1* | 1/2018 | Hawver | H04L 47/76 |
| 2019/0087113 | A1* | 3/2019 | Isozaki | G06F 3/0652 |

OTHER PUBLICATIONS

International Search Report and Written Opinion prepared by the European Patent Office dated Nov. 10, 2017, for International Application No. PCT/EP2017/071787.
Written Opinion prepared by the European Patent Office dated Nov. 10, 2017, for International Application No. PCT/EP2017/071787.
International Preliminary Report on Patentability—Chapter II of the Patent Cooperation Treaty prepared by the European Patent Office dated Nov. 20, 2018, for International Application No. PCT/EP2017/071787.
Official Action with English Translation for China Patent Application No. 201780053848.2, dated Aug. 20, 2020, 19 pages.
Official Action for U.S. Appl. No. 16/329,673, dated Feb. 20, 2020 8 pages.
Official Action for U.S. Appl. No. 16/329,673, dated May 29, 2020 7 pages.
Official Action for U.S. Appl. No. 16/329,673, dated Jul. 30, 2020 8 pages.
Notice of Allowance for U.S. Appl. No. 16/329,673, dated Jan. 22, 2021 7 pages.
Official Action with English Translation for Korea Patent Application No. 10-2019-7006522, dated Oct. 28, 2021, 11 pages.
Official Action with English Translation for Korea Patent Application No. 10-2019-7006522, dated Jun. 14, 2022, 5 pages.

\* cited by examiner

CONTROLLING ACCESS TO AN ACCESS OBJECT

CROSS REFERENCE TO RELATED APPLICATIONS

This application is a continuation of U.S. patent application Ser. No. 16/329,673 filed on Feb. 28, 2019, which is a national stage application under 35 U.S.C. 371 and claims the benefit of PCT Application No. PCT/EP2017/071787 having an international filing date of Aug. 30, 2017, which designated the United States, which PCT application claimed the benefit of European Patent Application No. 16187007.6 filed Sep. 2, 2016, the disclosure of each of which are incorporated herein by reference.

TECHNICAL FIELD

The invention relates to a method, an access control device, a computer program and a computer program product relating to controlling access to an access object using a sequence of delegations.

BACKGROUND

There are many types of objects for which it is desirable to control access, herein denoted access objects. For instance, an access object can be an office device (e.g. photocopier, printer, coffee machine, electrical socket, network connection etc.). Alternatively, the access object can be a charge point for an electric vehicle. Alternatively, the access object can be a lock for access to a physical space.

Access to such access objects can be controlled by requiring the use of an appropriate electronic key. The electronic key can communicate with an access control device over a wireless or wired interface. Such electronic interfaces improve usability while electronic key management is significantly more flexible regarding management of access rights compared to mechanical access control (e.g. using a mechanical key and lock), especially when a local access control device communicates with an access control server to verify access rights for a particular electronic key. In that way, access for a particular electronic key can be managed centrally by managing the access rights stored in the access control server.

However, there are a number of problems with this approach of central access right management. One problem is scalability, since the server and communication paths need to be scaled when new access control devices are deployed. Moreover, the system is vulnerable in the sense that the server needs to be available at all times for verifying access.

There are also offline systems available, where access rights are stored in the access control device or in the key. However, the offline systems are either very simple and non-flexible, or managed by intermittent access to a server, which gives the same problems as for an online system, albeit to a less degree.

One particular problem is when an access to the access object is to be removed for all current users, e.g. when the access object is sold. In the prior art, removing access needs to be performed for each user, which is a cumbersome process. Moreover, there is an element of insecurity for the new owner; the new owner needs to be completely confident that all previous users are invalidated.

SUMMARY

It is an object of embodiments presented herein to provide an improved way to control access to an access object.

According to a first aspect, it is presented a method for controlling access to an access object. The method is performed in an access control device and comprises the steps of: receiving a user input to reset the access control device; generating a new identifier for the access control device, and discarding any previously used identifier for the access control device; communicating with an electronic key to obtain an identity of the electronic key; obtaining a plurality of delegations, wherein each delegation is a delegation from a delegator to a receiver; and granting access to the access object only when the plurality of delegations comprise a sequence of delegations covering a delegation path from the access control device, identified using the new identifier, to the electronic key such that, in the sequence of delegations, the delegator of the first delegation is the access control device, and the receiver of the last delegation is the electronic key.

The access control device can be delivered without any set identifier when it is new. By using a self-created identity, nobody, not even the manufacturer, or the retailer having sold the device can track it. Nobody can tell the difference between two devices if they are reset, which gives great privacy for users of the access control device. In the prior art, it is common that electronic devices include a unique serial number which is set during manufacturing. Such serial numbers are not used with the embodiments presented herein. In this way, nobody can track a device after between two resets. When an access control device is reset, it is indistinguishable from a new access control device which has just been activated (using a reset). All history of the hardware (including logs stored by others) is in effect erased, or rather: the history of the hardware cannot be connected to any party having had communication with the access control device before; whatever happens to it in the future since the access control device is now connected with a completely different identifier. This is of great use also with ownership transfer of the access object, e.g. of a house or other lockable item. The new owner does not need to change locks and can be confident and completely certain that any previous owner has no way of accessing the access object.

In the step of generating a new identifier, the new identifier may comprise at least one cryptographic key pair.

The method may further comprise the step of: receiving an input to store the first delegation in storage of the access control device.

The step of obtaining a plurality of delegations may comprise obtaining at least one delegation from the electronic key.

Each delegation obtained from the electronic key may be digitally signed by the delegator of the respective delegation.

The method may further comprise the step of: evaluating time constraints of all of the plurality of delegations and wherein the step of granting access is only performed when none of the time constraints are violated.

The method may further comprise the step of: evaluating operation constraints of all of the plurality of delegations and wherein the step of granting access is only performed when none of the operation constraints deny the granting access operation.

According to a second aspect, it is presented an access control device for controlling access to an access object. The access control device comprises: a processor; and a memory storing instructions that, when executed by the processor, causes the access control device to: receive a user input to reset the access control device; generate a new identifier for the access control device, and discard any previously used identifier for the access control device; communicate with an electronic key to obtain an identity of the electronic key; obtain a plurality of delegations, wherein each delegation is a delegation from a delegator to a receiver; and grant access to the access object only when the plurality of delegations comprise a sequence of delegations covering a delegation path from the access control device, identified using the new identifier, to the electronic key such that, in the sequence of delegations, the delegator of the first delegation is the access control device, and the receiver of the last delegation is the electronic key.

The access control device may further comprise the instructions that, when executed by the processor, causes the access control device to: receive an input to store the first delegation in storage of the access control device.

The instructions to obtain a plurality of delegations may comprise instructions that, when executed by the processor, causes the access control device to obtain at least one delegation from the electronic key.

Each delegation obtained from the electronic key may be digitally signed by the delegator of the respective delegation.

According to a third aspect, it is presented a computer program for controlling access to an access object. The computer program comprises computer program code which, when run on a access control device causes the access control device to: receive a user input to reset the access control device; generate a new identifier for the access control device, and discard any previously used identifier for the access control device; communicate with an electronic key to obtain an identity of the electronic key; obtain a plurality of delegations, wherein each delegation is a delegation from a delegator to a receiver; and grant access to the access object only when the plurality of delegations comprise a sequence of delegations covering a delegation path from the access control device, identified using the new identifier, to the electronic key such that, in the sequence of delegations, the delegator of the first delegation is the access control device, and the receiver of the last delegation is the electronic key.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
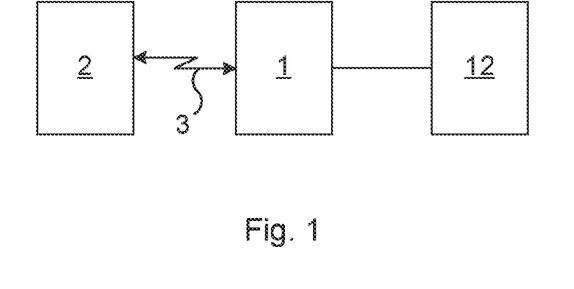
FIG. 1 is a schematic diagram showing an environment in which embodiments presented herein can be applied.

FIG. 1 is a schematic diagram showing an environment in which embodiments presented herein can be applied. Access to an access object 12 is controlled by an access control device 1. The access object can be any type of object to which access is to be selectively controlled. The access object 12 can be an office device (e.g. photocopier, printer, coffee machine, electrical socket, network connection etc.). Alternatively, the access object 12 can be a charge point for an electric vehicle. Alternatively, the access object 12 can be a lock for access to a physical space.

The access control device 1 is able to receive and send signals from/to an electronic key 2 over a communication channel 3 which may be a short range wireless interface or a conductive (i.e. galvanic/electric) connection. The electronic key 2 is any suitable device portable by a user and which can be used for authentication over the communication channel 3. The electronic key 2 is typically carried or worn by a user and may be implemented as a physical key, a key fob, wearable device, smart phone, etc. The short range wireless interface is a radio frequency wireless interface and could e.g. employ Bluetooth, Bluetooth Low Energy (BLE), ZigBee, Radio Frequency Identification (RFID), any of the IEEE 802.11 standards, any of the IEEE 802.15 standards, wireless Universal Serial Bus (USB), etc. The electronic key can also be considered to be a credential. Using the communication channel 3, the identity of the electronic key 2 can be obtained. Moreover, the authenticity of the identity electronic key 2 can be checked, e.g. using a challenge and response scheme or by verifying a digital signature. In any case, an identity of the electronic key 2 is obtained, which is used in the process to grant or deny access as explained in more detail below.

When access is granted, the access control device 1 sends a grant signal to the access object 12, whereby the access object 12 is set to a usable state. For instance, when the access object 12 is an office device, the access can be used as desired for photocopying, printing, making coffee, receiving power, gaining network access, etc. When the access object 12 is a charge point for an electric vehicle, charging of the vehicle can begin only after the grant signal is sent from the access control device 1 to the access object 12. When the access object 12 is a lock, the lock is set to an open state when the grant signal is sent from the access control device 1 to the access object 12.

The grant signal can be sent in any suitable way between the access control device 1 and the access object 12. For instance, the grant signal can be transmitted over a wire-based communication interface, e.g. using Universal Serial Bus (USB), Ethernet, a serial connection (e.g. RS-485 or RS-232) or even a simple electric connection, or alternatively signal over a wireless communication interface. Optionally, the access control device 1 is integrated with the access object 12, whereby the grant signal is transmitted internally, which may even occur as a software signal between different software modules of the combined access control device 1/access object 12.

Optionally, energy harvesting of mechanical user actions and/or environmental power (solar power, wind, etc.) can be utilised to prolong the life span of the battery or even to allow a battery to be omitted for the access control device 1 and/or the access object 12. Alternatively or additionally, mains power (optionally via a power converter) or a battery is used to power the access control device 1 and/or the access object 12.

Since the access control device 1 does not need any keypad, display or other large user interface component, the access control device 1 can be made very small to simplify integration with the access object 12.

Figure 2A:
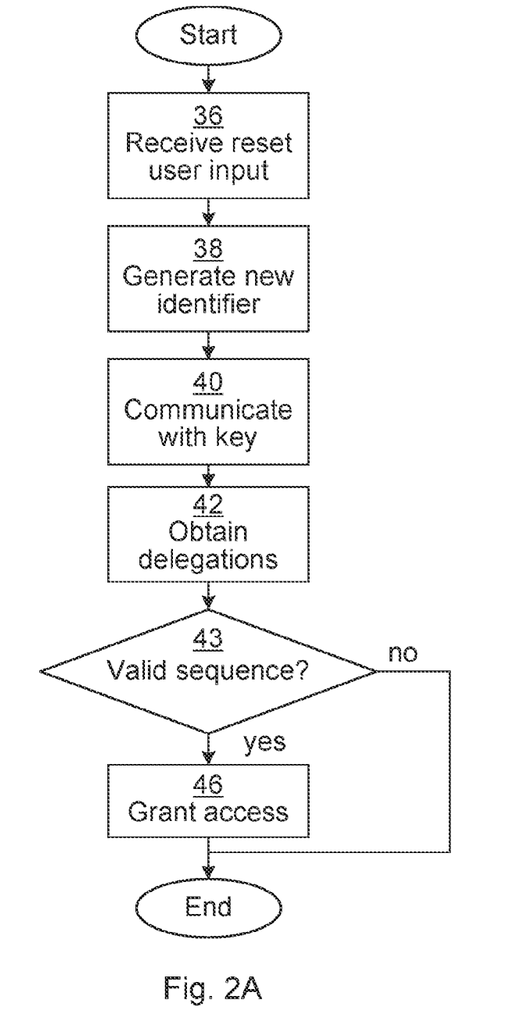
FIGS. 2A-B are flow charts illustrating methods for controlling access to a physical space, performed in the access control device of FIG. 1.
Figure 2B:
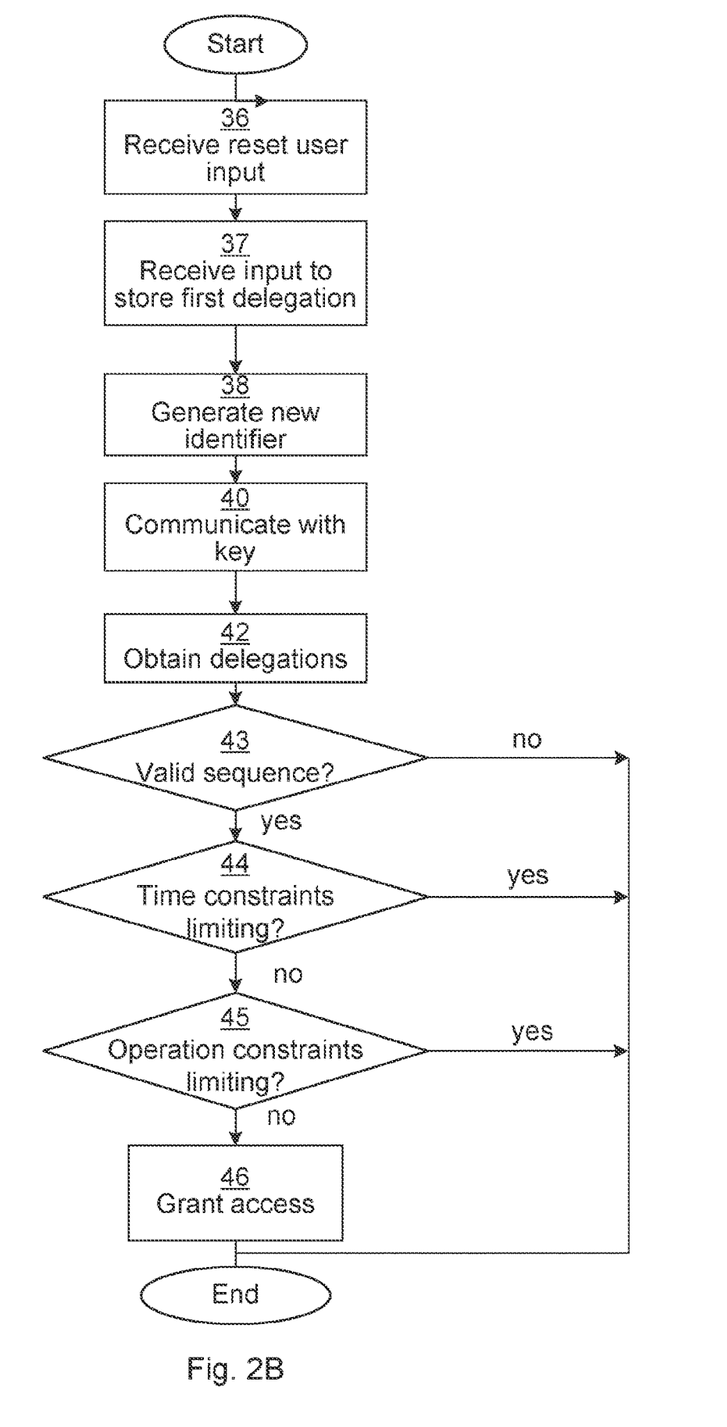

FIGS. 2A-B are flow charts illustrating methods for controlling access to an access object, performed in the access control device of FIG. 1. First, the embodiments illustrated by FIG. 2A will be described.

In a receive reset user input step 36, a user input is received to reset the access control device. This user input can be received e.g. by the user pressing a reset button on the access control device. Alternatively, a more general user interface of the access control device (e.g. touch screen, soft buttons, remote control from a smartphone, etc.) can be used by the user to indicate that the access control device is to be reset. When the user input is received using a dedicated reset button, the reset button can be provided in a secure location where it is not freely accessible. For instance, when the access object is a lock, the reset button can be provided on the inside of the lock or e.g. in a door frame/window frame, such that access needs to be granted prior to anyone actuating the reset button.

In a generate new identifier step 38, a new identifier for the access control device is generated, and any previously used identifier for the access control device is discarded. In other words, the previously used identifier is discarded. The identity can be generated in the form of one (or multiple) cryptographic key pairs, each comprising a public key and a private key. Such a key pair has these properties:

Globally unique (to an extremely high probability)
Extremely difficult to be forged
The identity can be proven using the public key, i.e. without exposing any secret information. The key holder can prove possession of the secret key corresponding to a public key without revealing any information about the secret key. This is also known as a zero-knowledge proof.
The key pair creation requires a good source of random data (non-predictable).

The access control device can be delivered without any set identifier when it is new. Hence, by using a self-created identity, nobody, not even the manufacturer, or the retailer having sold the device can track it. Nobody can tell the difference between two devices if they are reset, which gives great privacy for users of the access control device. In the prior art, it is common that electronic devices include a unique serial number which is set during manufacturing. Such serial numbers are not needed with the embodiments presented herein. In this way, nobody can track a device between two resets. When an access control device is reset, it is indistinguishable from a new access control device which has just been activated (using a reset). All history of the hardware (including logs stored by others) is in effect erased, or rather: the history of the hardware cannot be connected to any activity of the hardware in the future since the access control device is now connected using a completely different identifier.

In a communicate with key step 40, the access control device communicates with an electronic key to obtain an identity of the electronic key. The identity can be authenticated, e.g. as explained above.

In an obtain delegations step 42, a plurality of delegations is obtained. Each delegation is a data item indicating a delegation from a delegator to a receiver. Optionally, this comprises obtaining at least one delegation from a (local and persistent) storage of the access control device. For instance, the first delegation, being a delegation from the access control device, can be obtained from storage of the access control device. Optionally, this step comprises obtaining at least one delegation from the electronic key. In such a case, each delegation obtained from the electronic key can be mandated to be digitally signed by the delegator of the respective delegation, i.e. delegations from the electronic key which are not validly signed are discarded. It is to be noted that the first delegation can be implemented by assigning one or more owners in the configuration of the access control device. In other words, optionally, the first delegation can be implemented differently from the subsequent delegations in the sequence.

In a conditional valid sequence step 43, it is determined whether the plurality of delegations comprise a sequence of delegations covering a delegation path from the access control device (identified using the new identifier) to the electronic key such that, in the sequence of delegations, the delegator of the first delegation is the access control device, and the receiver of the last delegation is the electronic key. In the sequence of delegations, for each delegation except the first delegation, each delegator is the receiver of the preceding delegation. If this determination is affirmative, the method proceeds to a grant access step 46. Otherwise, the method ends. Since the new identifier of the access control device is used for the delegation path, any delegations using the previous identifier of the access control device are not considered and are thus invalid. Only delegation paths where the first delegation is based on the new identifier are considered.

In the grant access step 46, access to the access object is granted. This results in a grant signal being sent to the access object as explained above. Optionally, the grant signal comprises an indicator of the operation which is granted, e.g. charging, allowed to make coffee, allowed to make up to ten copies of a document, access to configuring the access object, setting the access object in a locked state, set a first delegation from the access control device to a receiver, remove a delegation, setting temporary pin code, blacklisting an electronic key, etc.

It is to be noted that a delegation can optionally be provided with a limitation to further delegations by the receiver of the delegation. For instance, a delegation can be provided with no right to further delegations by the receiver, with unlimited rights to further delegations, or with a right to delegate a certain number of further steps away from the delegator. This can be enforced in the access control device by verifying that no such limitation in further delegations is violated prior to granting access.

By generating a new identifier, any previous access delegations relating to the access control device are immediately invalidated, as explained in more detail below with reference to FIG. 7. This is very beneficial when all previously valid users should be invalidated. For instance, when the access control device and the access object are sold to a new owner, all old users are conveniently invalidated using the reset. Another usage scenario is when the access object is rented out (e.g. equipment rental, vehicle rental, property rental, etc.) and access to the access object is returned after the rental period. At that point, the old users should be invalidated from gaining access to the access object.

Looking now to FIG. 2B, only new or modified steps compared to the method illustrated by FIG. 2A are described.

In an optional receive input to store first delegation step 37, an input to store the first delegation in storage of the access control device is received. This input can be received as user input to the access control device. Alternatively, this input can be received as a signal from a configuration device, e.g. using an app in a smartphone. As explained above, the first delegation is a delegation from the access control device (here identified using the new identifier) to a first receiver (e.g. an owner of the access control device).

In an optional conditional time constraints limiting step 44, time constraints of all of the plurality of delegations are evaluated. When none of the time constraints is violated, the method proceeds to the grant access step 46 or an optional conditional evaluate operation constraints step 45 (when this forms part of the method). Otherwise, the method ends.

In the optional conditional operation constraints limiting step 45, operation constraints of all of the plurality of delegations are evaluated. When none of the operation constraints deny the granting access operation, the method proceeds to the grant access step 46. Otherwise, the method ends.

It is to be noted that the order of steps 43, 44, and 45 is not important and can be shifted as desired.

Some examples will now be presented to illustrate what is made possible with the solutions presented herein. In the examples here, while delegations are mentioned to be delegations to users, to make the description clearer, the delegations are implemented as delegations to electronic keys of the users. In other words, when a delegation to a user is mentioned, it is in fact a delegation to an electronic key associated with that user. It is to be noted that the type of access object is not important; the examples are only presented with particular access objects for the purpose of illustration.

Example A: Private Home Scenario

Figure 3A:
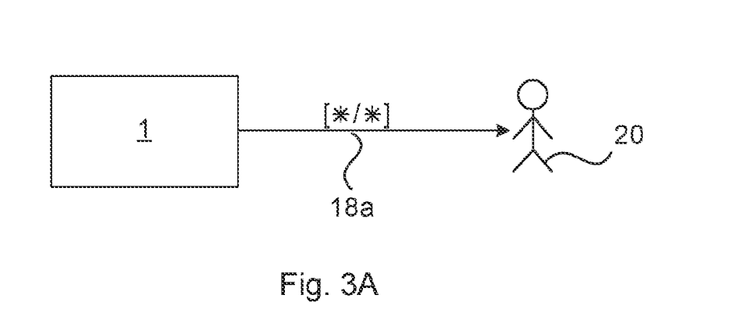
FIGS. 3A-C, FIG. 4, FIG. 5 and FIG. 6 are schematic diagrams illustrating an example of delegations what can be used in the access control device of FIG. 1.

This example is illustrated by delegations shown in FIG. 3A. Tim 20 buys an access control device 1, e.g. for controlling access to an access object being a charging station for an electric vehicle. The access control device 1 has no specific settings at the time of purchase stage; it is in a "factory reset" mode. Tim uses his mobile phone as an electronic key. The electronic key of his mobile phone is a cryptographic key pair. Tim can create a new key pair, or reuse an existing key pair (that may already be used to control other access objects).

The access control device stores a list of delegations and the first initial delegation 18a is depicted in FIG. 3A. This first delegation 18a is from the access control device to a first user Tim 20.

For delegations shown here, within the square brackets, the section before the slash indicates operation access and the section after the slash indicates time access. The character '*' denotes access without any restrictions. Hence, the first delegation 18a in FIG. 3A allows access to all operations of the access control device to Tim 20 at any time.

After this initial bootstrap delegation, Tim 20 is free to further delegate access to the access control device to his adult child Amy 21. Amy 21 does not live with Tim but has an electric car that she would like to charge when she visits Tim. Illustrated in FIG. 3B, there is now a second delegation from Tim 20 to his child Amy 21. This delegation is stored in the access control device 1. The second delegation 18b is restricted to the operation of charging (C), but there are no time restrictions. Hence, Amy does not have access to e.g. not reconfigure the access control device for other users. Note that the access control device can have more operations as explained above.

Figure 3B:
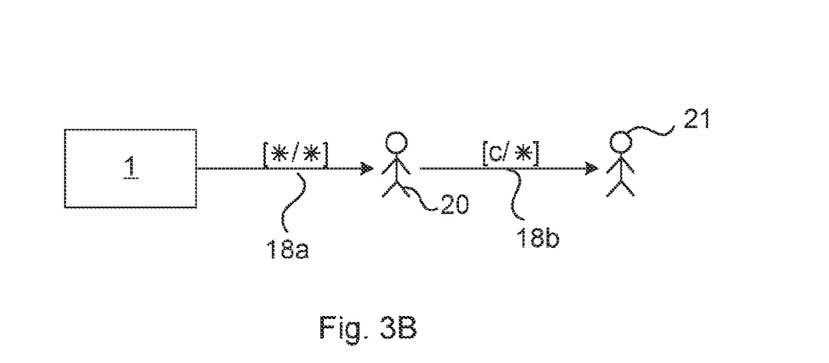
Figure 3C:
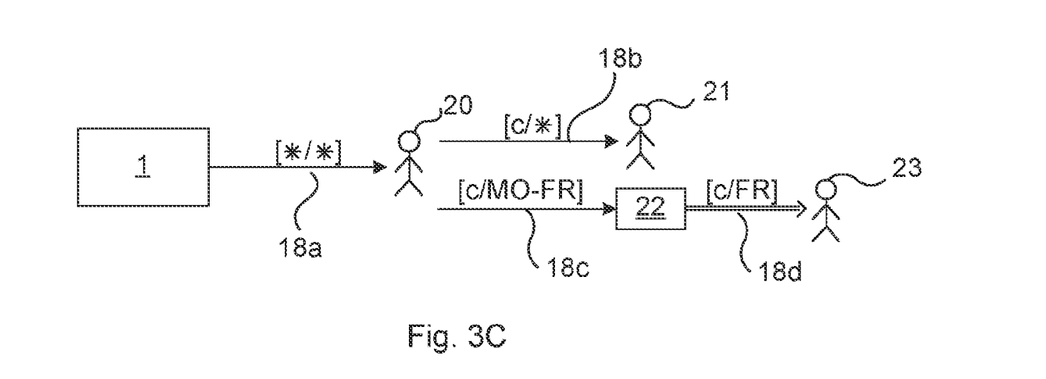

Looking now to FIG. 3C, more entities are added. Every Friday, the company Clean Inc. 22, sends a cleaner to clean Tim's house. Tim 20 has used the service for a long time and trusts Clean Inc. 22 to allow them to charge their electric vehicles while at Tim's house. He therefore creates a third delegation 18c to delegate access from Tim 20 to Clean Inc. 22 to charge (C) during weekdays (MO-FR).

Clean Inc. 22 uses its systems to create a fourth delegation 18d to further delegate access to a user Bill 23, one of their cleaners. This is done by Clean Inc. 22 creating a digitally signed fourth delegation 18d using a key pair. It is to be noted that each node can have multiple key pairs for different uses, e.g. a first key pair for encryption purposes and a second key pair for digital signing purposes. Nevertheless, it is also possible that each node has a single key pair which is used for multiple purposes. Signed delegations are indicated throughout the Figures with double arrows. This delegation is performed without the need to store the delegation in any central system; it can be done by Clean Inc. 22 on any computer with ability to digitally sign an electronic document. This fourth delegation 18d is then sent to the mobile phone of Bill 23 before he is about the clean Tim's house. The fourth delegation is digitally signed by Clean Inc.

When Bill 23 arrives by the access control device 1 on Friday, the signed fourth delegation 18d will be sent from his mobile phone to the access control device 1. The access control device will form a delegation sequence including both the delegations 18a-c stored in the access control device 1 and the signed delegations stored in the digital key (the phone). Mathematically, the delegation sequence can be considered to form an access graph, or more specifically a directed acyclic graph (DAG) where each node is an identity holding a key pair and each edge is a delegation. The access graph is in face illustrated by FIG. 3C.

When Bill wishes to charge his electric vehicle, access to the charge point will be granted if and only if there is a valid delegation sequence covering a delegation path from the access control device 1 to Bill 23 at the given time for the requested operation (charge).

In this example, there is a delegation sequence from the access control device 1 to Bill 23 via the first delegation 18a, the third delegation 18c and the fourth delegation 18d. For the time aspect, the most restricted delegation is the fourth delegation 18d, restricting to only Fridays. Since the charge operation is attempted on a Friday, the time constraint is not violated. Moreover, the operation, i.e. charging, is not limited by any of the delegations 18a, 18c, 18d of the delegation sequence. Hence, Bill 23 is granted access and the access control device 1 sends a grant signal to enable charging by the charging station.

Example B: Role Based Access Control

Figure 4:
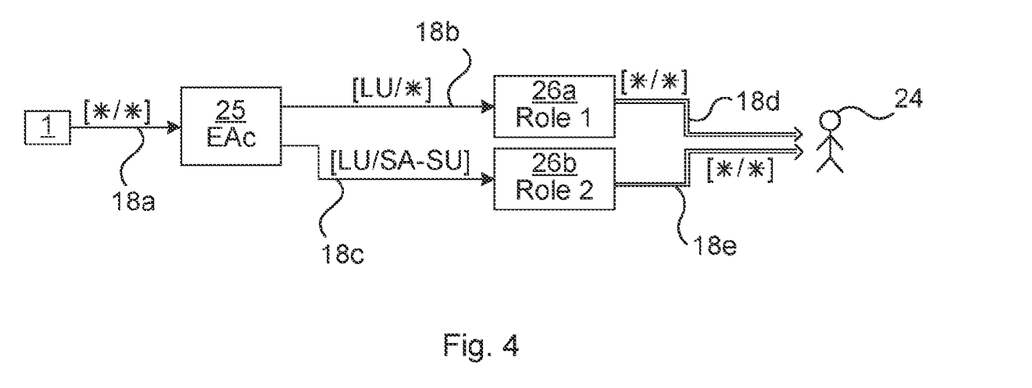

This example is illustrated by FIG. 4, for an example where the access control device is used to control physical access using an access object being a lock. There is here a first delegation 18a from the access control device 1 to an electronic access control system (EAC) 25. Furthermore, the EAC 25 stores a second delegation 18b to a first role 26a and a third delegation 18c to a second role 26b. Through the second delegation 18b, the first role 26a has access to the lock and unlock (LU) operations at any time, while the second role 26b has access to the LU operations during Saturdays and Sundays only.

The access control device is online and connected to the EAC 25 that configures the meaning of roles 26a-b for each particular access control device (and connected lock).

Each key stores delegations from roles to keys. For example, a user Ann 24 can store in her key a fourth (digitally signed) delegation 18d from the first role 26a to Ann 24 and a fifth delegation 18e from the second role 26b to Ann 24. Optionally, the delegation 18b/18c from the EAC 25 to the role in question is also stored in the key, which delegation can then be digitally signed.

During weekdays, Ann will be able to lock and unlock the lock because of the delegation path of the first delegation 18a, the second delegation 18b and the fourth delegation 18d.

In this way, role based access control with time constraints is achieved. The access control device side stores the delegations 18a-c from the access control device to roles 26a-b and the digital keys stores the delegations 18d-e from the roles to the keys. The role to key delegations 18d-18e are digitally signed.

Example C: User Controlled Access Control List

Figure 5:
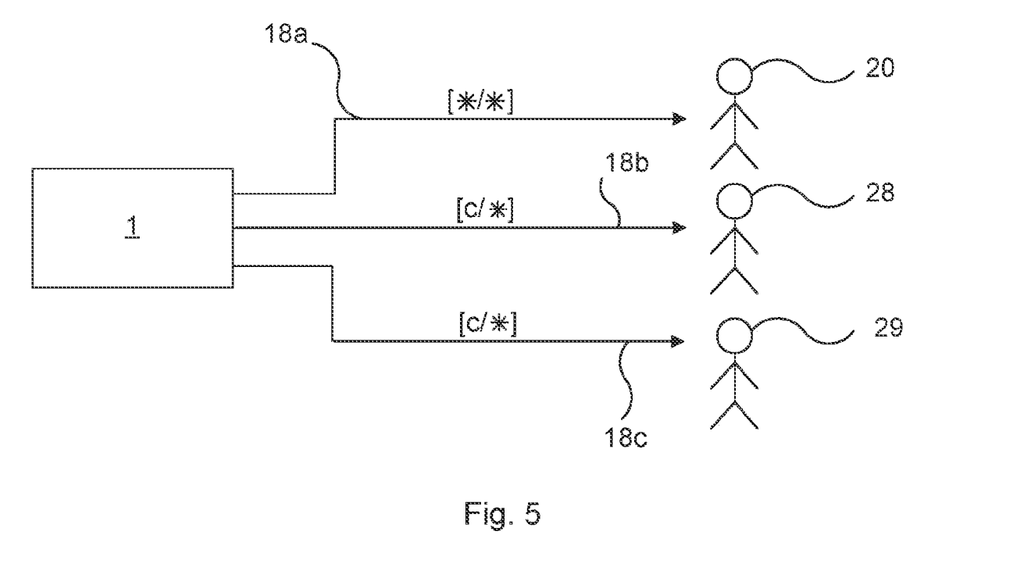

This example is illustrated by FIG. 5, where the access control device stores all delegations directly from the access control device 1 to the users. There is here a first delegation 18a from the access control device 1 to Tim 20, a second delegation 18b from the access control device 1 to Ada 28 and a third delegation 18c from the access control device 1 to Larry 29.

In this example, the key side does not store any delegations; only identification of the electronic key is necessary.

Example D: Multiple EACs

Figure 6:
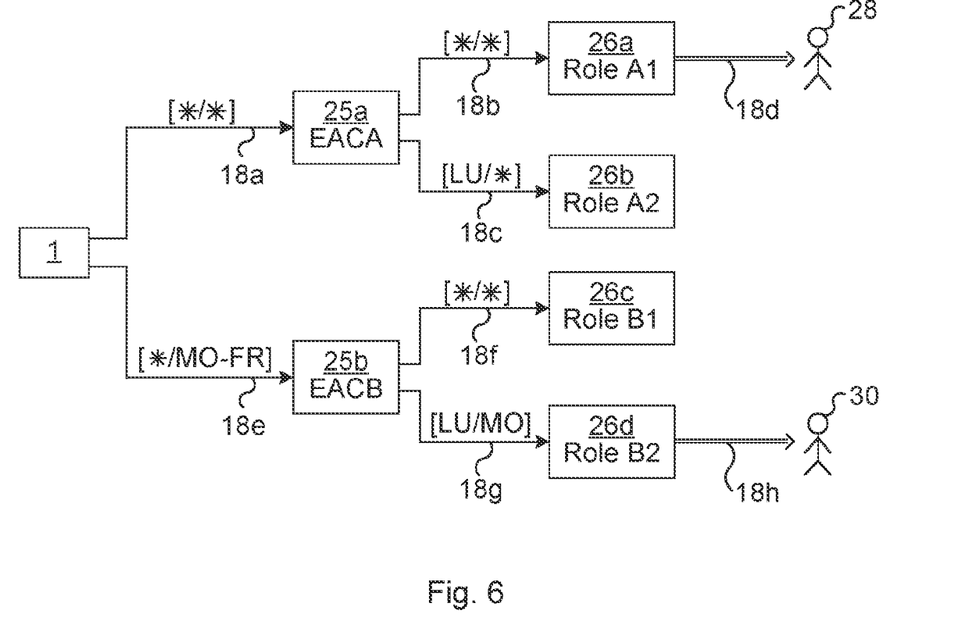

In this example, illustrated by FIG. 6, the access control device 1 participates in two EAC systems that both use role-based access control to delegate access to its users. This example highlights the possibility of how an access object (in this example a lock) is efficiently shared between multiple systems.

On the access control device side, there is a first delegation 18a from the access control device 1 to a first EAC 25a. Furthermore, the first EAC 25a stores a second delegation 18b to a first role 26a and a third delegation 18c to a second role 26b. Through the second delegation 18b, the first role 26a has access to all operations at any time, while the second role 26b has access to locking and unlocking only, but at any time. It is to be noted that this example also works in an offline scenario where the access control device 1 is not in contact with the EACs 25a-b. The access control device 1 can delegate access to an EAC (a set of delegations, one for each permission, current "root access" or "lock/unlock access"). The delegations then include all the documentation needed by the EAC in question to further group these into roles. This can be done in a single message from a lock owner (assigned in the access control device 1) to the EAC in question. For instance, this can be implemented in an app in a smart phone that sends an email with an attachment comprising the delegation(s) to the EAC. The attached file then contains all the information about the lock that the EAC needs to create roles and delegate access.

Moreover, there is a fifth delegation 18e from the access control device 1 to a second EAC 25b. The fifth delegation 18e permits all operations but only from Monday to Friday. Furthermore, the second EAC 25b stores a sixth delegation 18f to a third role 26c and a seventh delegation 18g to a fourth role 26d. Through the sixth delegation 18f, the third role 26c has access to all operations at any time (but in effect restricted to Monday to Friday by the fifth delegation 18e), while the fourth role 26d has access to locking and unlocking only on Mondays.

In this example, there is a fourth (digitally signed) delegation 18d from the first role 26a to Ada 28. Moreover, there is an eighth delegation 18h from the fourth role 26d to Bob 30.

Hence, using the delegation sequences in this example, multiple organisations can gain access to a single access object (such as a lock, photocopier, coffee machine, etc.) in an efficient and convenient manner. This can be of particular interest in an environment where multiple organisations share a physical space, e.g. multiple companies being tenants in a building with some common areas for all tenants.

By using the delegation sequence as described here, great flexibility and control is provided without the need for a central access server, since all delegations can occur without any online access. Still, as shown above, delegations can optionally be made to electronic access control systems if desired (e.g. due to legacy systems, etc.). Delegations can be made in any suitable way directly or indirectly, supporting new business cases not possible using prior art systems. By supporting many use cases and scenarios, a single type of access control device and access object can be used, i.e. there no need for multiple versions of the access control device or access object for different uses, greatly reducing costs in development, production and distribution.

Embodiments presented herein function just as well in offline and in online scenarios. Moreover, as illustrated in FIG. 6 and described above, multiple access control systems are supported without any need for the access control to adapt to each other. In fact, the access control systems do not even need to know about the existence of each other.

Also, by not requiring a central server, massive scalability is provided. Security is also improved since there is no single point, which can be attacked by an attacker, controlling access for all access objects. Through the use of the sequence comprising signed delegations, non-repudiation is achieved. The non-repudiation is achieved for the delegations that are digitally signed. Optionally, all delegations are digitally signed to achieve a complete sequence of non-repudiatable delegations.

Figure 7:
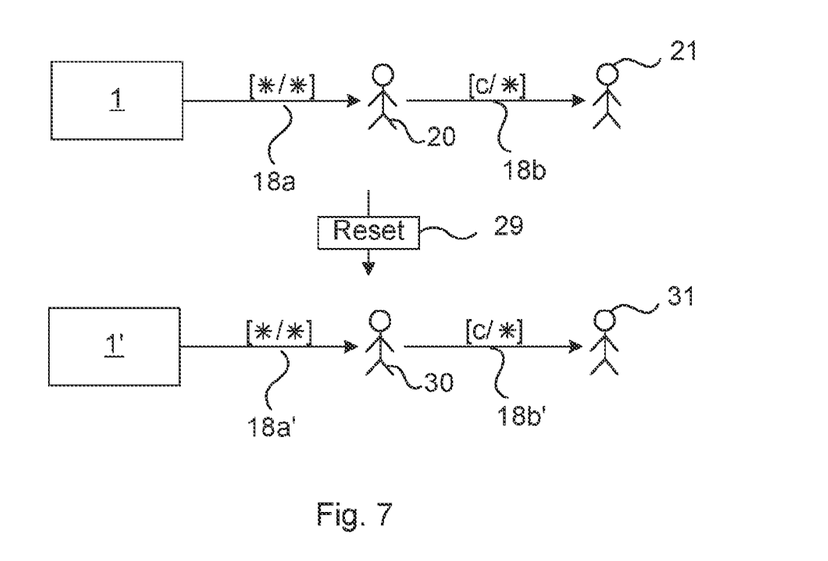
FIG. 7 is a schematic diagram illustrating an example of when a reset is performed in the access control device of FIG. 1.

FIG. 7 is a schematic diagram illustrating an example of when a reset is performed in the access control device of FIG. 1.

The upper part of FIG. 7 is logically similar to the situation of FIG. 3B, relating to a charging station. However, in this example, the access object is a lock, e.g. for a front door of a house (i.e. a private home).

The upper part of FIG. 7 shows the access control device 1, controlling access to the lock. Tim 20 initially configures the access control device 1 to have its first delegation 18a from the access control device 1 to himself, or more specifically to a device of Tim 20, e.g. an electronic key, smartphone, etc. Tim can then create a further delegation 18*b* to Amy 21. In this example, there are no restrictions with regard to operations or timing of either of the two delegations 18*a-b*. Nevertheless, such restrictions can also be applied, as explained above, if desired.

Consider the situation when the house is sold to a new owner, Thomas 30. Traditionally, Thomas would need to change the locks of the house to prevent access to the lock for any previous users, who had access to the lock when Tim owned the house.

Using the embodiments presented herein, Thomas 30 simply needs to reset the access control device 1 to block access for any previous users.

When a reset 29 is performed, as explained above, the access control device 1 generates a new identifier in the form of one or more key pairs. The access control device with the new identifier is shown here with reference numeral 1'.

After the reset, the access control device 1' can be configured by the new owner, Thomas 30, storing a new first delegation 18*a*' from the reset access control device 1' to Thomas 30. Thomas is then free to further delegate access in a new second delegation 18*b*', e.g. to Ashley 31.

In this way, if e.g. Amy 21 were to try to open the lock using the reset access control device 1', there is no valid delegation from the reset access control device 1' since its identifier has been changed. Hence, any delegation made using the old access control device is instantly made invalid when the reset 29 occurs and the new identifier is generated. In this way, when Thomas 30 becomes the new owner of the house where the lock is controlled by the access control device, he can safely reset the access control device and be confident that any users which previously had access (e.g. cleaners, Tim's family, Tim's friends) no longer have access. This makes securing a lock much more convenient.

It is to be noted that the reset process of FIG. 7 can be combined with any of the examples shown in FIGS. 3A-C, FIG. 4-6 which are described above.

Figure 8:
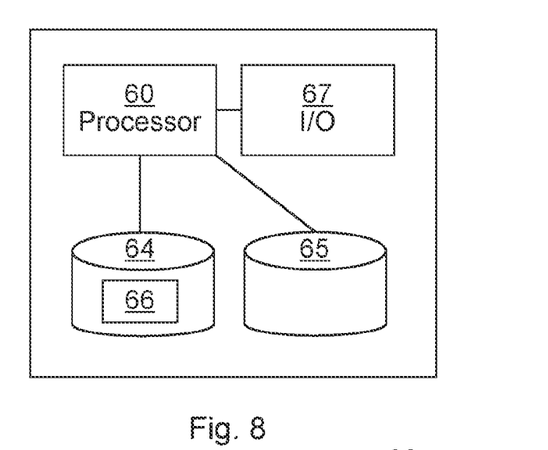
FIG. 8 is a schematic diagram illustrating some components of an access control device according to FIG. 1.

FIG. 8 is a schematic diagram showing some components of the access control device 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIGS. 2A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 is also provided for reading and/or storing data during execution of software instructions in the processor 60. The data memory 65 can be any combination of read and write memory (RAM) and read only memory (ROM) which may be persistent and/or volatile memory. The data memory 65 can form part of the access control device 1 or be external, but local to, the access control device 1. The data memory 65 can store delegations as described above. The delegations can be stored in a persistent part of the data memory 65, e.g. in a flash memory.

The access control device 1 further comprises an I/O interface 67 for communicating with other external entities such as the access object 12 and the electronic key 2. The I/O interface 67 may also comprise a reader for reading key cards with a magnetic strip or a smart card. The I/O interface 67 may support wire-based communication, e.g. using Universal Serial Bus (USB), Ethernet, or even a simple electric connection (e.g. to the access object 12) or a galvanic/electric connection for communicating with the electronic key 2. Alternatively or additionally, the I/O interface 67 supports wireless communication, e.g. using Bluetooth, BLE, ZigBee, RFID, any of the IEEE 802.11 standards, any of the IEEE 802.15 standards, wireless USB, etc., e.g. for communication with the electronic key 2.

The I/O interface 67 also comprises a user interface allowing a user to perform a reset of the access control device 1. The user interface can e.g. comprise a dedicated reset button or a more general interface allowing a user to indicate that a reset of the access control device 1 is to be performed.

Other components of the access control device 1 are omitted in order not to obscure the concepts presented herein.

Optionally, the access object 12 of FIG. 1 forms part of the access control device 1.

Figure 9:
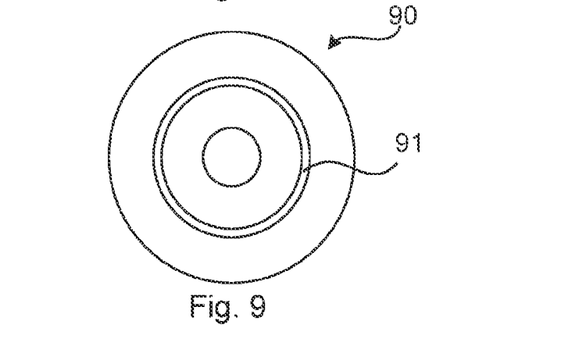
FIG. 9 shows one example of a computer program product comprising computer readable means.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 8. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for controlling access to an access object, the method being performed in an access control device and comprising the steps of:
  receiving a user input to reset the access control device;
  generating a new identifier for the access control device;
  communicating with an electronic key to obtain an identity of the electronic key;
  obtaining a plurality of delegations, wherein each delegation is a delegation from a delegator to a receiver; and
  granting access to the access object only when the plurality of delegations comprise a sequence of delegations covering a delegation path from the access control device, identified using the new identifier, to the electronic key such that, in the sequence of delegations, the delegator of the first delegation is the access control device, and the receiver of the last delegation is the electronic key.

ii. The method according to embodiment i, wherein in the step of generating a new identifier, the new identifier comprises at least one cryptographic key pair.

iii. The method according to embodiment i or ii, further comprising the step of:
  receiving an input to store the first delegation in storage of the access control device.

iv. The method according to any one of the preceding embodiments, wherein the step of obtaining a plurality of delegations comprises obtaining at least one delegation from the electronic key.

v. The method according to embodiment iv, wherein each delegation obtained from the electronic key is digitally signed by the delegator of the respective delegation.

vi. The method according to any one of the preceding embodiments, further comprising the step of:
evaluating time constraints of all of the plurality of delegations and wherein the step of granting access is only performed when none of the time constraints are violated.

vii. The method according to any one of the preceding embodiments, further comprising the step of:
evaluating operation constraints of all of the plurality of delegations and wherein the step of granting access is only performed when none of the operation constraints deny the granting access operation.

viii. An access control device for controlling access to an access object, the access control device comprising:
a processor; and
a memory storing instructions that, when executed by the processor, causes the access control device to:
receive a user input to reset the access control device;
generate a new identifier for the access control device;
communicate with an electronic key to obtain an identity of the electronic key;
obtain a plurality of delegations, wherein each delegation is a delegation from a delegator to a receiver; and
grant access to the access object only when the plurality of delegations comprise a sequence of delegations covering a delegation path from the access control device, identified using the new identifier, to the electronic key such that, in the sequence of delegations, the delegator of the first delegation is the access control device, and the receiver of the last delegation is the electronic key.

ix. The access control device according to embodiment viii, further comprising the instructions that, when executed by the processor, causes the access control device to:
receive an input to store the first delegation in storage of the access control device.

x. The access control device according to any one of embodiments ix to xi, wherein the instructions to obtain a plurality of delegations comprise instructions that, when executed by the processor, causes the access control device to obtain at least one delegation from the electronic key.

xi. The access control device according to embodiment xii, wherein each delegation obtained from the electronic key is digitally signed by the delegator of the respective delegation.

xiv. A computer program for controlling access to an access object, the computer program comprising computer program code which, when run on a access control device causes the access control device to:
receive a user input to reset the access control device;
generate a new identifier for the access control device;
communicate with an electronic key to obtain an identity of the electronic key;
obtain a plurality of delegations, wherein each delegation is a delegation from a delegator to a receiver; and
grant access to the access object only when the plurality of delegations comprise a sequence of delegations covering a delegation path from the access control device, identified using the new identifier, to the electronic key such that, in the sequence of delegations, the delegator of the first delegation is the access control device, and the receiver of the last delegation is the electronic key.

xv. A computer program product comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling access to an access object, the method being performed in an access control device and comprising:
receiving a user input to reset the access control device; and
generating a new identifier of the access control device, and erasing, from the access control device, all previously used identifiers for the access control device to thereby invalidate all previous access delegations for all previous users, for access to the access object controlled by the access control device.

2. The method according to claim 1, wherein in generating a new identifier, the new identifier comprises at least one cryptographic key pair.

3. The method according to claim 1, further comprising:
communicating with an electronic key to obtain an identity of the electronic key;
obtaining a plurality of delegations, wherein each delegation is a delegation from a delegator to a receiver; and
granting access to the access object only when the plurality of delegations comprises a sequence of delegations covering a delegation path from the access control device, identified using the new identifier, to the electronic key such that, in the sequence of delegations, the delegator of a first delegation in the plurality of delegations is the access control device, and the receiver of a last delegation in the plurality of delegations is the electronic key.

4. The method according to claim 3, further comprising:
receiving an input to store the first delegation in storage of the access control device.

5. The method according to claim 3, wherein the obtaining a plurality of delegations comprises obtaining at least one delegation from the electronic key.

6. The method according to claim 5, wherein each delegation obtained from the electronic key is digitally signed by the delegator of the respective delegation.

7. The method according to claim 3, further comprising:
evaluating time constraints of all of the plurality of delegations and wherein the granting access is only performed when none of the time constraints are violated.

8. The method according to claim 3, further comprising:
evaluating operation constraints of all of the plurality of delegations and wherein the step of granting access is only performed when none of the operation constraints deny the granting access.

9. An access control device for controlling access to an access object, the access control device comprising:
a processor; and
a memory storing instructions that, when executed by the processor, causes the access control device to:

receive a user input to reset the access control device; and generate a new identifier of the access control device, and erase all previously used identifiers for the access control device thereby invalidating all previous access delegations for all previous users, for access to the access object controlled by the access control device.

10. The access control device according to claim 9, further comprising the instructions that, when executed by the processor, causes the access control device to:

communicate with an electronic key to obtain an identity of the electronic key;

obtain a plurality of delegations, wherein each delegation is a delegation from a delegator to a receiver; and grant access to the access object only when the plurality of delegations comprises a sequence of delegations covering a delegation path from the access control device, identified using the new identifier, to the electronic key such that, in the sequence of delegations, the delegator of a first delegation in the plurality of delegations is the access control device, and the receiver of a last delegation in the plurality of delegations is the electronic key.

11. The access control device according to claim 10, further comprising the instructions that, when executed by the processor, causes the access control device to:

receive an input to store the first delegation in storage of the access control device.

12. The access control device according to claim 11, wherein the instructions to obtain a plurality of delegations comprise instructions that, when executed by the processor, causes the access control device to obtain at least one delegation from the electronic key.

13. The access control device according to claim 12, wherein each delegation obtained from the electronic key is digitally signed by the delegator of the respective delegation.

14. A non-transitory computer-readable medium comprising a computer program for controlling access to an access object, the computer program comprising computer program code which, when run on a access control device causes the access control device to:

receive a user input to reset the access control device; and generate a new identifier of the access control device, and erase all previously used identifiers for the access control device to thereby invalidate all previous access delegations for all previous users, for access to the access object controlled by the access control device.

* * * * *